June 20, 1950 — L. J. GOULD — 2,512,204
FLYING SAW
Filed April 11, 1946 — 4 Sheets-Sheet 1

Inventor
Leo J. Gould.
By R. S. A. Dougherty.
Attorney

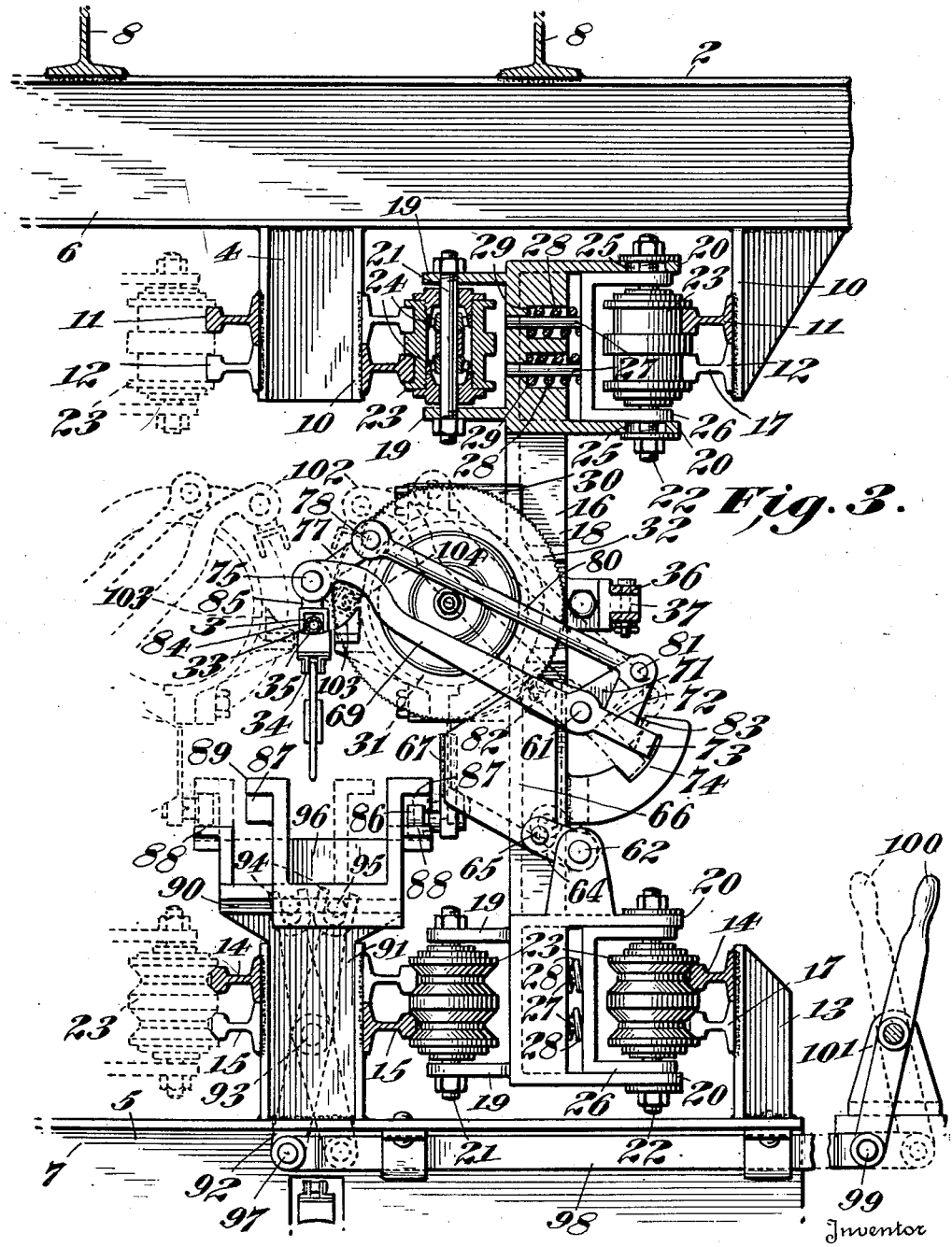

June 20, 1950 L. J. GOULD 2,512,204
FLYING SAW
Filed April 11, 1946 4 Sheets-Sheet 3
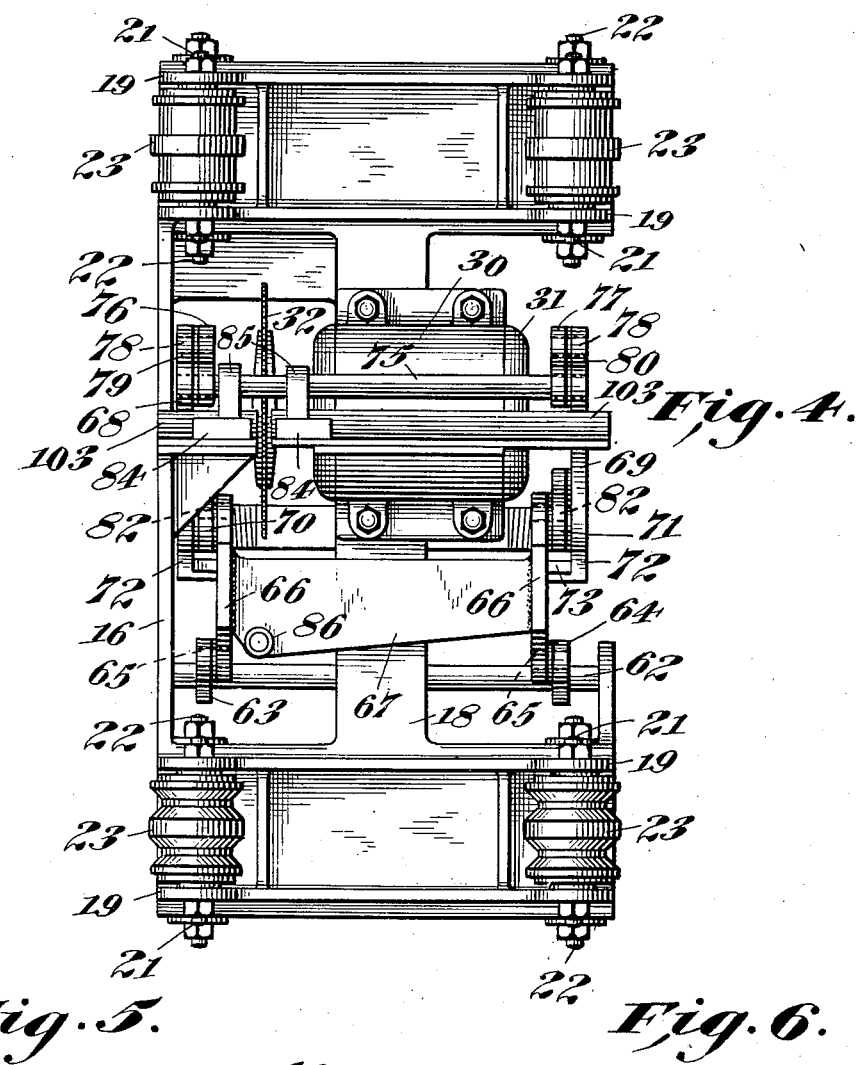
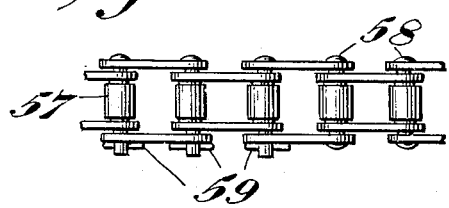
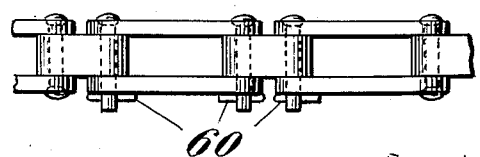
Inventor
Leo J. Gould.
By R. S. C. Dougherty
Attorney June 20, 1950 L. J. GOULD 2,512,204
FLYING SAW
Filed April 11, 1946 4 Sheets-Sheet 4
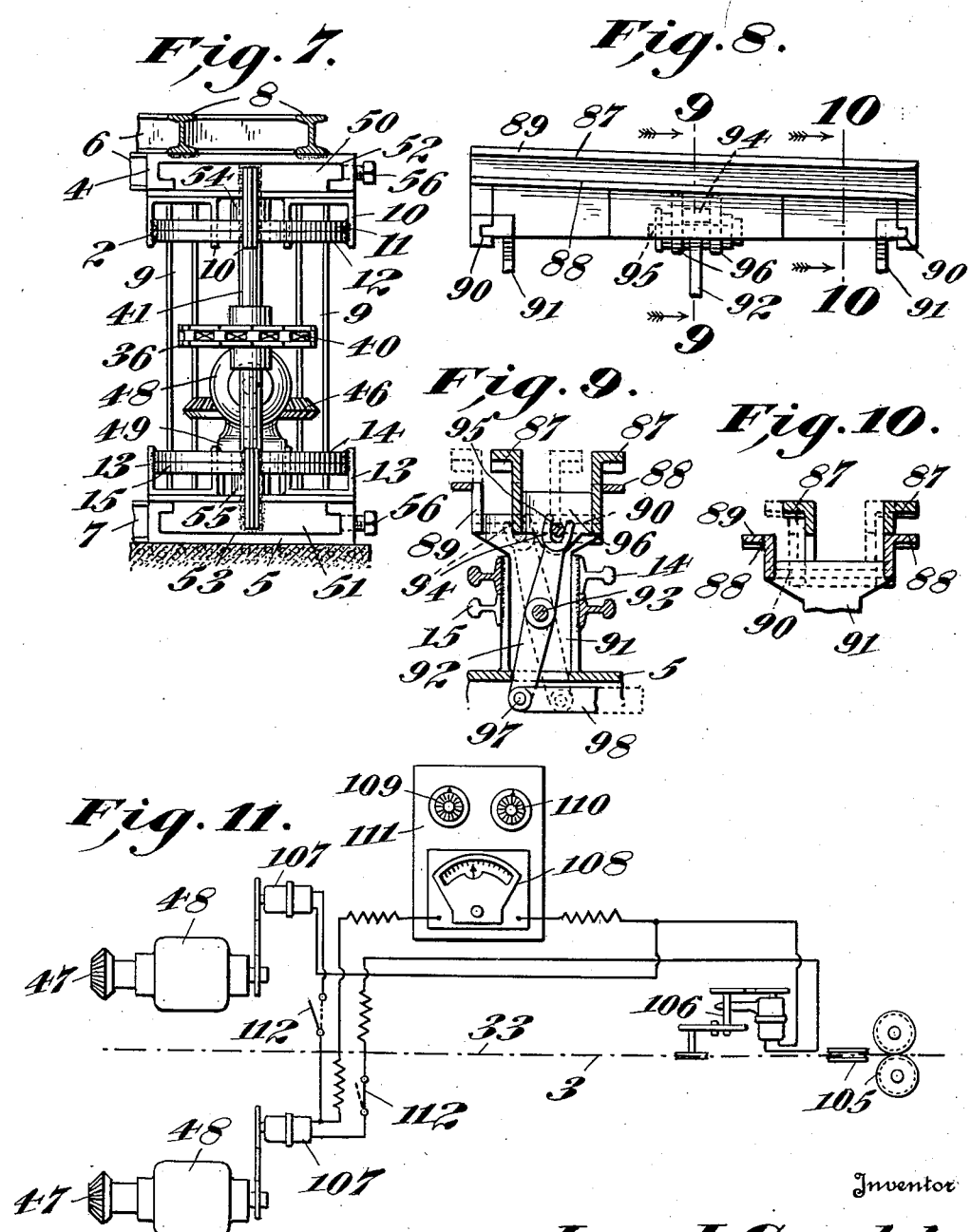
Inventor
Leo J. Gould.
By R. S. C. Dougherty.
Attorney Patented June 20, 1950

2,512,204

UNITED STATES PATENT OFFICE 2,512,204

FLYING SAW

Leo J. Gould, Bethlehem, Pa., assignor to Bethlehem Steel Company, a corporation of Pennsylvania Application April 11, 1946, Serial No. 661,393

8 Claims. (Cl. 29—69)

My invention relates to apparatus for automatically severing rapidly moving tubular or rod-like metal objects in motion, and is more particularly adapted for the rapid cutting of semi-finished pipes or tubing in a continuous butt-weld pipe mill.

In pipe mills of this type the skelp when it comes from the rolling mill is in large coils. These coils are fed rapidly in succession to a machine which uncoils the skelp and straightens it and then it is advanced in a ribbon-like form on a run out table or floor of the mill to form a loop or a series of loops. The skelp is then advanced through a gas furnace or the like wherein it is heated to a welding temperature. As it emerges from the furnace it is drawn through a bell or forming rolls, then between welding and sizing rolls, and while still hot and advancing rapidly it is cut by a flying saw into commercial lengths, usually of about 20 feet although this length may be greater or less as desired. The cut lengths are then passed between descaling rolls, and lastly are transferred to a cooling bed.

After a coil of skelp has been fed in this manner the next coil is placed in the machine for uncoiling. As this coil is fed to the run out table the crop ends of the rear end of the fed coil and the forward end of the coil to be fed are cut off or squared and the two ends welded together. These operations are repeated and the skelp and the pipe formed therefrom are advanced continuously at high speed.

Heretofore flying saws have been used for severing pipe in a continuous butt-weld pipe mill in which the flying saw is mounted on a reciprocating saw carriage having a relatively short stroke and to move the pipe into cutting engagement with the saw, or to use trough or guide supports for the moving pipe in a fixed position with relation to the saw carriage, while the motor and saw oscillate on a reciprocating saw carriage to cut the pipe. Mounting the motor and saw to oscillate on a reciprocating saw carriage to cut the pipe has the disadvantage that the saw motor and saw and a portion of the saw carriage together may weigh several hundreds pounds.

If the pipe is traveling at a speed of 300 feet a minute (which for small pipe is usually exceeded) and is being cut into 20 foot lengths, the saw must make a cut every four seconds. But tripping so much weight at high speed causes excessive wear on the carriage and to eliminate this condition the mill must be slowed down, thus reducing the tonnage produced, or else an undue amount of valuable time and labor must be expected to be wasted in frequent shut-downs for repairs.

In either of these two types of machines the reciprocating carriages have a short stroke and the length of time for the cutting operation and the cams for controlling the same are relatively short.

Another disadvantage in using one flying saw mounted on a reciprocating saw carriage is that in case the machine becomes defective the entire mill has to be shut down for repairs and the skelp in the furnace becomes burned and has to be discarded and valuable time is wasted with the loss of production.

To obviate this defect I have arranged two machines of the same type adjacent to each other, one on opposite sides of the pipe pass line with flying saws mounted on continuously traveling carriages arranged in such a manner that when one machine becomes inoperative the other can be immediately thrown into operation.

One of the objects of my invention relates generally to apparatus for cutting into lengths continuously moving pipe and particularly to an apparatus in which a machine having saw carriages provided with flying saws is mounted for continuous travel on tracks disposed adjacent to each other on opposite sides of the pipe pass line.

Another object of my invention relates to apparatus for cutting into lengths continuously moving pipe and to apparatus in which a separate machine having one or more saw carriages each provided with a continuously rotating flying saw thereon mounted for continuous travel on a plurality of tracks disposed adjacent to each other on opposite sides of the pipe pass line and means for throwing the continuously moving pipe into cutting engagement with the flying saws of each machine.

Another object of my invention relates to apparatus for cutting into lengths continuously moving pipe and to apparatus in which a separate machine having one or more saw carriages each provided with a continuously rotating flying saw thereon is mounted for continuous travel on a plurality of tracks disposed adjacent to each other on opposite sides of the pipe pass line, means for throwing the continuously moving pipe into cutting engagement with the flying saws of each machine, and means for throwing each machine into or out of operation independently of each other.

Another object of the invention relates to apparatus for cutting into predetermined lengths continuously moving pipe and to means for synchronizing the movement of the pipe severing device with the moving pipe.

Another object of my invention relates to the cam for increasing the time for making the saw cut.

Another object of my invention relates to the mounting of the saw carriages and the manner of telescoping the track structure for adjusting the length of the track for different pipe length cuts.

Other objects will appear hereinafter.

Having thus given a general description of my invention, I will now in order to make the same more clear refer to the annexed four sheets of drawings forming a part of this specification and in which like characters of reference indicate like parts.

Fig. 3 is an enlarged detail view of one of the saw carriages and the adjacent portions of the frame work for supporting the same taken substantially on the line 3—3 of Fig. 1 with parts indicated in section.

Fig. 4 is a side elevation of one of the saw carriages.

Figs. 5 and 6 are detail views of two forms of sprocket chains I may use.

Fig. 7 is an end elevation of one of the machine structures.

Fig. 8 is a side elevation of the double cam for transferring the pipe from one machine to the other machine disposed adjacent thereto.

Fig. 9 is a transverse section of the double cam taken on the line 9—9 of Fig. 8.

Fig. 10 is a transverse section of the double cam taken on the line 10—10 of Fig. 8 and Fig. 11 illustrates diagrammatically mechanism for adjusting the longitudinal movement of the saws and carriages at substantially the same speed as the pipe during the cutting operation.

Figure 1:
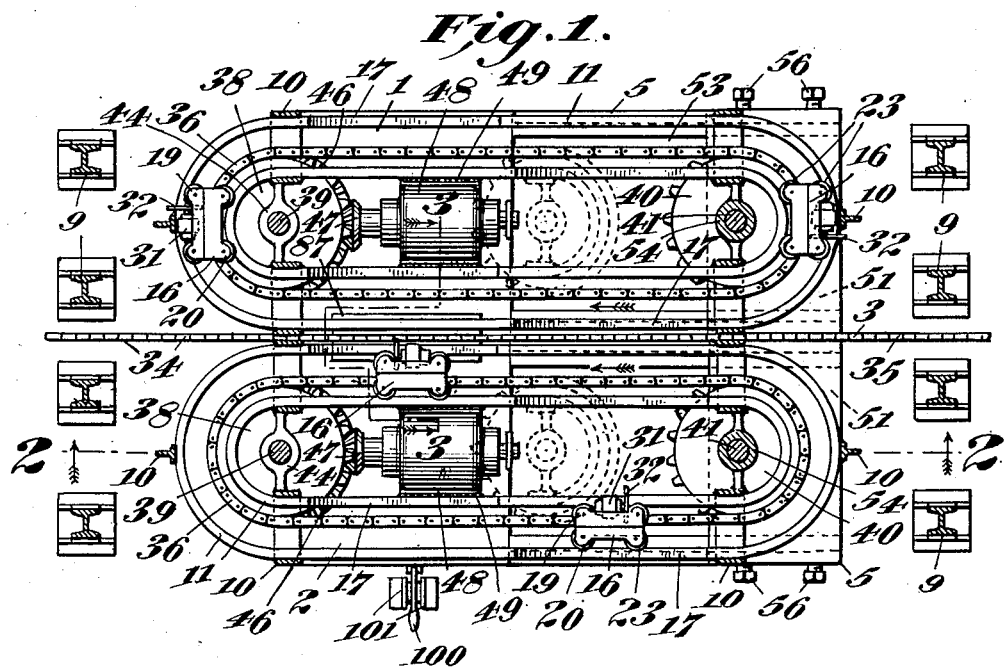
Figure 1 is a sectional plan view taken substantially along the line 1—1 of Fig. 2 illustrating the arrangement of a multiple pipe cutting apparatus embodying my invention with parts of the supporting brackets for the track structure omitted to more clearly show the structure.

Referring to the various characters of reference on the drawings, the numerals 1 and 2 indicate a pair of machine units for cutting continuous piping into length which are disposed adjacent to each other on opposite sides of the pipe pass line 3. Each machine is provided with a top frame 4 and a base frame 5. The two top frames 4, and the base frames 5 are connected together transversely by means of cross beams 6 and 7 respectively, and the top frames 4 are further supported and reinforced by means of longitudinally extending beams 8 supported at their ends on columns 9.

As both of the machine units are of substantially the same construction, except being arranged right and left so a detailed description of one will apply to both. The top frame 4 of each machine unit is provided with downwardly extending brackets 10 for supporting a pair of elongated elliptical track structures 11 and 12 each having parallel sides and rounded ends, while the base frame 5 have upwardly extending brackets 13 for supporting a pair of similar elongated elliptical track structures 14 and 15 for supporting saw carriages 16. Portions of the rails for each of the track structures 11, 12, 14 and 15 are cut out as at 17 to allow the tracks to telescope for adjustment, in cutting different pipe lengths which will be described more fully hereinafter.

As shown in Fig. 1 each unit or machine is shown provided with two carriages, but one or more than two can be used if desired.

Referring to Figs. 3 and 4 which shows more clearly the saw carriages 16 each have a vertically extending frame 18 with a pair of laterally extending spaced flanges 19 and 20 at each side of their upper and lower ends for receiving axles 21 and 22 upon which are mounted double rollers 23 each provided with roller bearings 24 for engaging the elongated elliptical tracks 11, 12, 14 and 15. The pairs of axles 21 journaled in the flanges 19 at each of the upper and lower ends at one side of the vertically extending frame 18 are relatively fixed while the pairs of axles 22 adjacent thereto at each of the upper and lower ends of said frame 18 have their ends extending through slots 25 in the flanges 20 and are mounted for sliding movement in U-shaped slides 26, each having a pair of cylindrical extensions 27 with springs 28 thereon mounted in sockets 29 in the frame 18 for holding the double rollers 23 yieldingly in contact with the track rails 11, 12, 14 and 15.

Secured at an intermediate point to one side of the vertically extending frame 18 by a clamping bearing block 30 is a motor 31 for continuously rotating the cutting saw 32 for severing the pipe 33, which is advanced in the pipe line pass 3 to a point adjacent to the saw 32 for the cutting operation by means of a guide conveyer 34 having a series of cradles 35 for supporting the pipe. In operation each saw carriage 16 is adapted to travel continuously in an elongated elliptical path supported by the double rollers 23 engaging the tracks 11, 12, 14 and 15 and to accomplish this continuous movement or travel a sprocket chain 36 is pivotally attached to the vertically extending frame 18 at an intermediate point by means of a lug as at 37. The sprocket chain 36 extends around a sprocket wheel 38 mounted on a relatively fixed driven shaft 39 at one end of the machine and around a sprocket wheel 40 on an adjustable shaft 41 at the opposite end of the machine. The relatively fixed shaft 39 is journaled in stationary bearings 42 and 43 mounted on the top and base frames 4 and 5 respectively and further provided with bearings 44 and 45 having their side edges welded to the downwardly projecting supporting brackets 10 and the upwardly extending supporting brackets 13 secured to the stationary portions of the top and bottom frames 4 and 5. A beveled gear 46 is keyed to the relatively fixed shaft 39 which meshes with a beveled pinion 47 driven by a motor 48 mounted on a base 49 seated on the top of the base frame 5 and is welded at each side to one of the inner track structures 14 and 15.

The adjustable shaft 41 has its top and bottom ends journaled in slides 50 and 51 which are mounted for adjustment in slideways 52 and 53 formed in the top and base frames 4 and 5 respectively and are also provided with bearings 54 and 55 which have their side edges welded to downwardly projecting supporting brackets 10, and the upwardly extending brackets 13 are secured to the movable track structure of the top and bottom frames 4 and 5.

Figure 2:
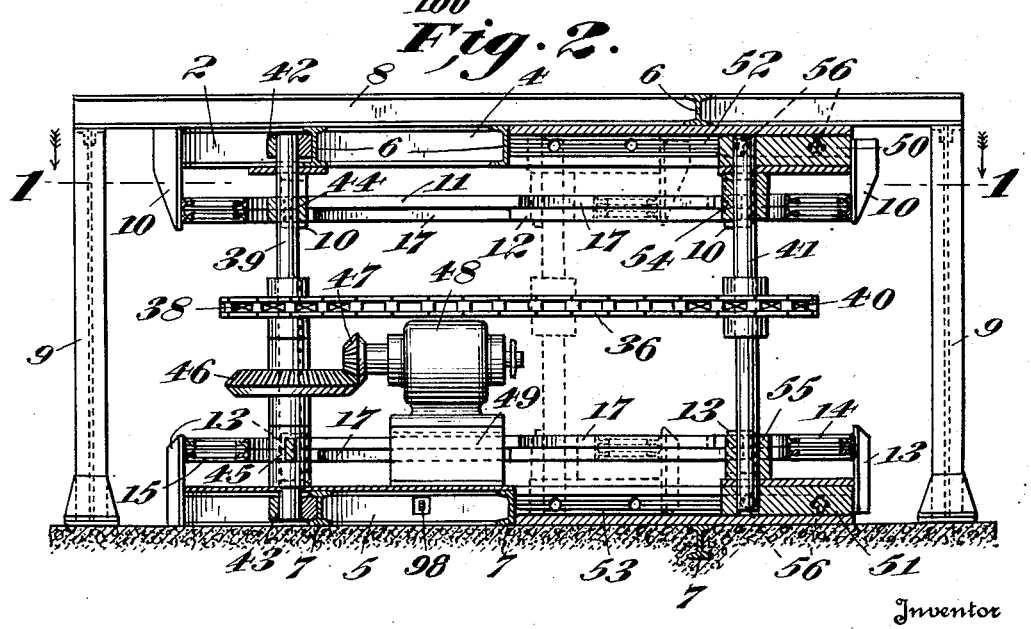
Fig. 2 is a vertical longitudinal section taken on the line 2—2 of Fig. 1 of one of the machine structures.

As indicated in Figs. 1 and 2 the track structure is indicated in full lines in the position it will assume in cutting the longest length of pipe. When it is desired to cut a shorter length of pipe the sprocket wheel 40 and the adjustable shaft 41, top and bottom slides 50 and 51 with the track structures mounted thereon at the right hand end of the machine can be adjusted inwardly in the slideways 52 and 53 for different pipe lengths, the shortest length being indicated in dotted lines, and to hold the slides in their adjusted positions set bolts 56 may be used for that purpose. As the sprocket chains will become slack during the adjusting operation of the sprocket wheel 40 and shaft 41 a section of the sprocket chain has to be removed, the length of which will depend on the amount of adjustment and for this purpose some of the links of the sprocket chain are detachable in a well known manner as indicated in Figs. 5 and 6. Fig. 5 shows a roller type of sprocket chain 57 having some of the pins for securing the links together riveted as at 58 and other pins detachable by means of cotter-pins 59. Fig. 6 shows another well known type of sprocket chain having some of the pins for securing the link together riveted and others detachable by means of cotter-pins 60.

Referring now to the cutting operation and the means for throwing in and out of operation each machine and for transferring the cutting operation from one machine to the other and assuming that the parts are in the position indicated in full lines in Figs. 3 and 4. Journaled in bearings on the saw carriage frame are upper and lower horizontally extending shafts 61 and 62. The lower shaft 62 is provided near each end with crank arms 63 and 64 having their opposite ends pivoted as at 65 to the lower portion of the flanged ends 66 of an actuating bar 67. The upper shaft 61 has mounted on each end pipe guide controlling levers 68 and 69 and adjacent thereto bell crank levers 70 and 71. The lower ends 72 of the pipe guide controlling levers 68 and 69 extend a short distance below the shaft 61 and are connected together as at 73 and engages a stop 74 for limiting their swinging movement, while their upper ends are pivoted to the ends of a horizontally extending rock shaft 75 having links 76 and 77 mounted thereon adjacent to said guide controlling levers 68 and 69 which have their opposite ends pivoted as at 78 to the upper ends of connecting rods 79 and 80 one of each of which is mounted above and parallel with each of the guide controlling levers 68 and 69. The lower ends of the connecting rods 79 and 80 are pivoted as at 81 to one arm of each of the bell crank levers 70 and 71, while the other arm of the bell crank levers which is the same length as the crank arms 63 and 64 is pivoted as at 82 to the upper portions of the flanged ends 66 of the actuating bar 67. The lower ends of each of the connecting rods are also provided with an angular arm 83 for engaging the lower extending ends 72 of the pipe guide controlling levers 68 and 69.

A pipe guide 84 of inverted U-shape is adapted to normally engage the cradles 35 of the pipe conveyer 34 adjacent to each side of the saw 32 and are connected to the rock-shaft 75 by means of arms 85.

In order to actuate the mechanism for throwing the pipe into cutting engagement with the saw 32, the actuating bar 67 for each saw carriage is provided with a cam roller 86 for engaging the upper and lower cam surfaces 87 and 88 of a double cam 89 which is adapted to have its upper cam surface moved laterally for throwing in or out the cutting mechanism for each machine on slideways 90 on a pedestal support 91 by means of a lever 92 pivoted centrally as at 93 to the pedestal support and having a forked upper end 94 for engaging a pin 95 supported in downwardly extending flanges 96 of the movable double cam member. The lower end of the lever 92 is pivoted as at 97 to a rod 98 which extends laterally to the outside of the machine and is pivoted at 99 to the lower end of a manually operated lever 100 pivotally supported in bearing 101. When the movable portion of the double cam 89 is in the position indicated in full lines in Figs. 3, 9 and 10, one machine is adapted to be in operation and the other machine adjacent thereto is thrown out of operation. If the movable portion of the double cam is in the position indicated in dotted lines in Figs. 3 and 9, the other machine will be in operation. If the movable portion of the double cam is in the position indicated in dotted lines in Fig. 10, both the machines will be out of operation.

In performing the cutting operation, when the cam roller 86 engages the cam surfaces 87 and 88 of the double cam 89 it raises the actuating bar 67 and the parts connected thereto thereby moving the pipe guide controlling levers 68 and 69, rock-shaft 75, connecting rods 79, 80 and pipe guides 84 to the position indicated at 102 in dotted lines in Fig. 3, during this operation the pipe guides 84 and the moving pipe 33 are guided by the curved or arc shaped surfaces 103 adjacent to the conveyer 34, as indicated in dotted lines at 104 in said figure.

It will be understood that only one machine is in operation at one time, this will allow for adjustment or repairing of the other machine if required without shutting down the pipe mill.

It is necessary in order to operate effectively the two machines that they be adjusted to move the saw carriages and the saws mounted thereon longitudinally during the cutting operation at a speed substantially the same as the advance of the pipe. To determine in advance whether or not the longitudinal speed of the saw will be correct, I provide means for measuring speed of advance of the tube as it comes from the last rolls 105 of the mill, and I also provide means for measuring the speed of rotation of the armature of the motor 48 for driving the mechanism that moves the saw carriages 16 to determine the speed of the carriages during the cutting operation.

As shown in Fig. 11 a tachometer 106 preferably of the electrical type, is disposed adjacent to the last mill rolls 105 and engages the moving pipe as it issues from the rolls to measure its speed. A second tachometer 107 is operatively connected to the shaft of the motor 48 and is responsive to the speed of the motor. Both the tachometer 106 and the tachometer 107 are connected differentially to a speed indicating instrument 108 in such a manner that when a tachometer is operated alone the indication of the speed indicating instrument represents the speed of the device to which the tachometer is connected. However, if both tachometers are operated at once the speed instrument indicates the difference in speed recorded by them. Consequently when the pipe 33 is issuing from the mill rolls 105 and the motor 48 is advancing the saw carriages 16 the instrument 108 will indicate the difference between the speed of the advance of the pipe and the speed at which the saw carriages 16 are moved by the motor 48.

As the speed of the saw carriages 16 should equal the speed of the pipe during the cutting operation or, in other words, their relative speed should be zero, it is simply necessary to so regulate the speed of the motor 48 to the speed of the mill rolls 105 that the differential speed indicating instrument 108 indicates zero to effect the proper speed relation between saw carriages 16 and the pipe. To accomplish the synchronization of the advancing pipe 33 and the saw carriages 16, suitable control devices, such as rheostats 109 and 110 may be connected in any well known manner, to control the speed of the motor 48 and the speed of the mill rolls 105 respectively. For convenience, in operation the rheostats 109 and 110 and the differential speed indicator may be mounted on a control panel 111 in such a manner that the speed instrument 108 may be observed while manipulating the rheostats.

As the two machines 1 and 2 are adapted to be operated independently of each other it is necessary to use a tachometer 107 operatively connected to the shaft of the motor 48 for each machine and to control the circuits to each by means of a switch 112. When one machine is in operation the switch 112 will be closed and the switch for the other machine will be open. If the other machine is thrown in, this will be reversed.

Although I have shown and described my invention in considerable detail, I do not wish it to be limited to the exact construction shown and described, but may use such substitutions, modifications or equivalents thereof, as are embraced within the scope of my invention, or as pointed out in the claims.

Having thus described my invention what I claim as new and desire to secure by Letters Patent is:

1. A machine for severing continuously moving pipe or the like into lengths, comprising stationary top and base frames, means for supporting the top frame in spaced relation to the base frame, a driven shaft having its ends journaled in the stationary top and base frames adjacent to one end of the machine, a slideway formed in the top and base frames at the opposite end of the machine, a slide in each slideway, an adjustable shaft having its ends journaled in the slides, a chain and sprocket connection between the driven and adjustable shafts, an elongated elliptical track structure mounted on each top and base frame, a carriage connected to the sprocket chain and mounted on the track structures, means for rotating the driven shaft to continuously advance the carriage in its line of travel, a rotating saw mounted on the carriage, and means for moving the pipe laterally into or out of cutting engagement with the saw.

2. A machine for severing continuously moving pipe or the like into lengths, comprising stationary top and base frames, an elongated elliptical track structure mounted on each top and base frame, a carriage mounted on the track structures, means for continuously advancing the carriage in its line of travel on the track structures, a rotating saw mounted on the carriage, and means for moving the pipe laterally into or out of cutting engagement with the saw.

3. A machine for severing continuously moving pipe or the like into lengths, comprising stationary top and base frames, means for supporting the top frame in spaced relation to the base frame, a driving shaft having its ends journaled in the stationary top and base frames adjacent to one end of the machine, a slideway formed in the top and base frames at the opposite end of the machine, a slide in each slideway, an adjustable shaft having its ends journaled in the slides, a chain and sprocket connection between the driven and adjustable shafts, brackets extending from the top and base frames, two pairs of upper and lower elongated elliptical track structures, each pair of said elongated elliptical track structures arranged one track within the other in spaced relation and supported by the brackets extending from the top and base frames, a carriage connected to the sprocket chain having rollers resiliently engaging the track structures, means for rotating the driving shaft to continuously advance the carriage in its line of travel, a rotating saw mounted on the carriage, and means for moving the pipe laterally into or out of cutting engagement with the saw.

4. A machine disposed adjacent to the pipe pass line for severing continuously moving pipe or the like into lengths, comprising stationary top and base frames, a pair of elongated elliptical track structures secured to each top and base frame, a vertically disposed shaft at each end of the machine having the upper and lower ends journaled in the top and base frames, a chain and sprocket connection for the shafts, a carriage having rollers engaging the track structures, a connection between the sprocket chain and the carriage, means for rotating the shafts to continuously advance the carriage in its line of travel on the tracks, a saw mounted on the carriage, means for continuously rotating the saw, and means for moving the pipe laterally into or out of cutting engagement with the saw.

5. A machine disposed adjacent to the pipe pass line for severing continuously moving pipe or the like into lengths, comprising stationary top and base frames, means for supporting the top frame in spaced relation to the base frame, two pairs of elongated elliptical track structures secured to each top and base frame, a vertically disposed shaft at each end of the machine having their upper and lower ends journaled in the top and base frames, a journal bearing near each end of the shafts having flanged side edges secured to the track structures, a chain and sprocket connection for the shafts, a carriage having double rollers engaging the elongated elliptical tracks, a connection between the sprocket chain and the carriage, means for rotating the shafts to continuously advance the carriage in its line of travel on the tracks, a saw mounted on the carriage, means for continuously rotating the saw, and means for moving the pipe laterally into or out of cutting engagement with the saw.

6. A machine disposed adjacent to the pipe pass line for severing continuously moving pipe or the like into lengths, comprising stationary top and base frames, means for supporting the top frame in spaced relation to the base frame, two pairs of elongated elliptical track structures secured to each top and base frame, a vertically disposed shaft at each end of the machine having their upper and lower ends journaled in the top and base frames, a journal bearing near each end of the shafts having flanged side edges secured to the track structures, a chain and sprocket connection for the shafts, a carriage having double rollers engaging the elongated elliptical tracks, a connection between the sprocket chain and the carriage, means for rotating the shafts to continuously advance the carriage in its line of travel on the tracks, a saw mounted on the carriage, means for continuously rotating the saw, swinging guide troughs in the pipe pass line carried by the carriage, levers pivotally connected to the carriage and the guide troughs, a cam for actuating the guide troughs to move the pipe laterally into cutting engagement with the saw, and means for guiding the pipe and guide troughs for the cutting operation.

7. In apparatus for severing continuously moving pipe or the like into lengths, comprising a machine arranged adjacent to the side of the pipe pass line, said machine having stationary top and base frames, means for supporting the top frame in spaced relation to the base frame, a driven shaft having its ends journaled in the stationary top and base frames adjacent to one end of the machine, a slideway formed in each of the top and base frames at the opposite end of the machine, a slide in each slideway, means of adjusting the slides, means for securing the slides in their adjusted positions, an adjustable shaft having its ends journaled in the slides, a chain and sprocket connection between the driven and adjustable shafts, two pairs of elongated elliptical track structures, each pair of said elongated elliptical track structures arranged one track within the other in spaced relation mounted on each top and base frames, a carriage connected to the sprocket chain and mounted on the track structures, means for rotating the driven shaft to continuously advance the carriage in its line of travel, a rotating saw mounted on the carriage, and means for moving the pipe laterally into or out of cutting engagement with the saw.

8. In apparatus for severing continuously moving pipe or the like into lengths, comprising a machine arranged adjacent to the side of the pipe pass line, said machine having stationary top and base frames, means for supporting the top frame in spaced relation to the base frame, two pairs of elongated elliptical track structures secured to each top and base frame, each pair of said elongated elliptical track structures arranged one track within the other in spaced relation, a vertically disposed shaft at each end of the machine having their upper and lower ends journaled in the top and base frames, an additional journal bearing near each end of the shafts having flanged side edges secured to the inner pairs of track structures, a chain and sprocket connection for the shafts, a carriage having double rollers at its upper and lower ends for engaging the elongated elliptical track structures, a connection between the sprocket chain and the carriage, means for rotating the shafts to continuously advance the carriage in its line of travel on the tracks, a saw mounted on the carriage, means for continuously rotating the saw, and means for moving the pipe laterally into or out of cutting engagement with the saw.

LEO J. GOULD.

REFERENCES CITED

The following references are of record in the file of this patent:

UNITED STATES PATENTS

| Number | Name | Date |
| --- | --- | --- |
| 558,646 | Hardie | Apr. 21, 1896 |
| 1,222,547 | Jackson | Apr. 10, 1917 |
| 1,367,564 | Pritchard | Feb. 8, 1921 |
| 1,418,437 | Grupe | June 6, 1922 |
| 1,580,809 | Brown | Apr. 23, 1926 |
| 1,681,306 | Moon | Aug. 21, 1928 |
| 1,740,430 | Mudd | Dec. 17, 1929 |
| 2,120,853 | Brown et al. | June 14, 1938 |
| 2,157,067 | Brown et al. | May 2, 1939 |
| 2,211,362 | Bennett | Aug. 13, 1940 |
| 2,452,343 | Wilson | Oct. 26, 1948 |

FOREIGN PATENTS

| Number | Country | Date |
| --- | --- | --- |
| 426,304 | Great Britain | Apr. 1, 1935 |